US009704387B1

(12) United States Patent
Goodman

(10) Patent No.: US 9,704,387 B1
(45) Date of Patent: Jul. 11, 2017

(54) SELF-ILLUMINATING REMOTE CONTROLLER

(71) Applicant: Robert C. Goodman, Hicksville, NY (US)

(72) Inventor: Robert C. Goodman, Hicksville, NY (US)

(*) Notice: Subject to any disclaimer, the term of this patent is extended or adjusted under 35 U.S.C. 154(b) by 205 days.

(21) Appl. No.: 14/625,912

(22) Filed: Feb. 19, 2015

Related U.S. Application Data

(63) Continuation-in-part of application No. 13/664,919, filed on Oct. 31, 2012, now abandoned.

(51) Int. Cl.
*G08C 17/02* (2006.01)
*G06F 3/044* (2006.01)

(52) U.S. Cl.
CPC ............ *G08C 17/02* (2013.01); *G06F 3/044* (2013.01); *G08C 2201/10* (2013.01); *G08C 2201/30* (2013.01)

(58) Field of Classification Search
CPC ..... H04N 21/42204–21/42225; H04N 5/4403; H04N 5/57; H04N 5/58; F21V 33/0052
See application file for complete search history.

(56) References Cited

U.S. PATENT DOCUMENTS 4,638,294 A * 1/1987 Sakurai .............. G08B 13/2491 180/287
5,073,843 A 12/1991 Magee
5,210,467 A 5/1993 Nagashima
D367,654 S 3/1996 Hertzfeld et al.
5,568,367 A 10/1996 Park
5,655,826 A 8/1997 Kouno et al.
5,705,997 A 1/1998 Park
6,903,655 B2 6/2005 Stefanik
2003/0189211 A1 10/2003 Dietz
2004/0268391 A1* 12/2004 Clercq ................ H01H 9/0235 725/37
2007/0040676 A1* 2/2007 Bandringa ........... G08B 29/183 340/567
2009/0243909 A1* 10/2009 Reams .................. G06F 1/3203 341/173
2011/0260624 A1* 10/2011 Bigge .................... H05B 37/02 315/119
2012/0274218 A1* 11/2012 Mountain ............... H04M 1/22 315/152
2014/0190737 A1* 7/2014 Chen .................. G07C 9/00944 174/535
2015/0070337 A1* 3/2015 Bell ..................... G09G 3/2003 345/207
2015/0124100 A1* 5/2015 McRory ................ H04N 7/185 348/151

* cited by examiner

*Primary Examiner* — Laura Nguyen

(57) ABSTRACT

The present invention features a remote controller with touch switch and light sensor for key illumination control. When a user picks up the controller, a touch switch circuit is activated through means of contact strips built into the aides of the device. These strips sense a human body's capacitance. When this is sensed, an ambient light sensor is activated if the sensor detects low/no light conditions, which are adjustable to a user's preference. it activates a relay which then powers lamps to illuminate the remote controller. The lamps stay illuminated for an adjustable period of time based on user preference.

2 Claims, 4 Drawing Sheets

SELF-ILLUMINATING REMOTE CONTROLLER

CROSS REFERENCE

This application claims priority to U.S. patent application Ser. No. 13/664,919 filed Oct. 31, 2012 as a continuation-in-part, the specification(s) of which is/are incorporated herein in their entirety by reference.

FIELD OF THE INVENTION

The present invention related to a remote controller, and more particularly to a remote controller with touch switch for illumination control.

BACKGROUND OF THE INVENTION

Lot of users feels the inconvenience of using remote controller in low/no light conditions. Some people may have to turn on a light in a room when other people may be sleeping. Presently phosphor illumination (glow in the dark) is being used. This needs light to charge, so if it is in long term darkness it would be ineffective. The glow in the dark illumination lasts for only a few minutes. Some remote controllers only illuminate buttons once a function key is pressed. The possibility of pressing an unwanted function key to activate the illumination is very high. The user will still have to search for that key in darkness.

This invention would ease the visibility of buttons in low/no light conditions. It eliminates the possibility of performing an unwanted function. It also eliminates the possibility of disturbing other people, for example, having to turn on a light in a room when other people may be sleeping.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
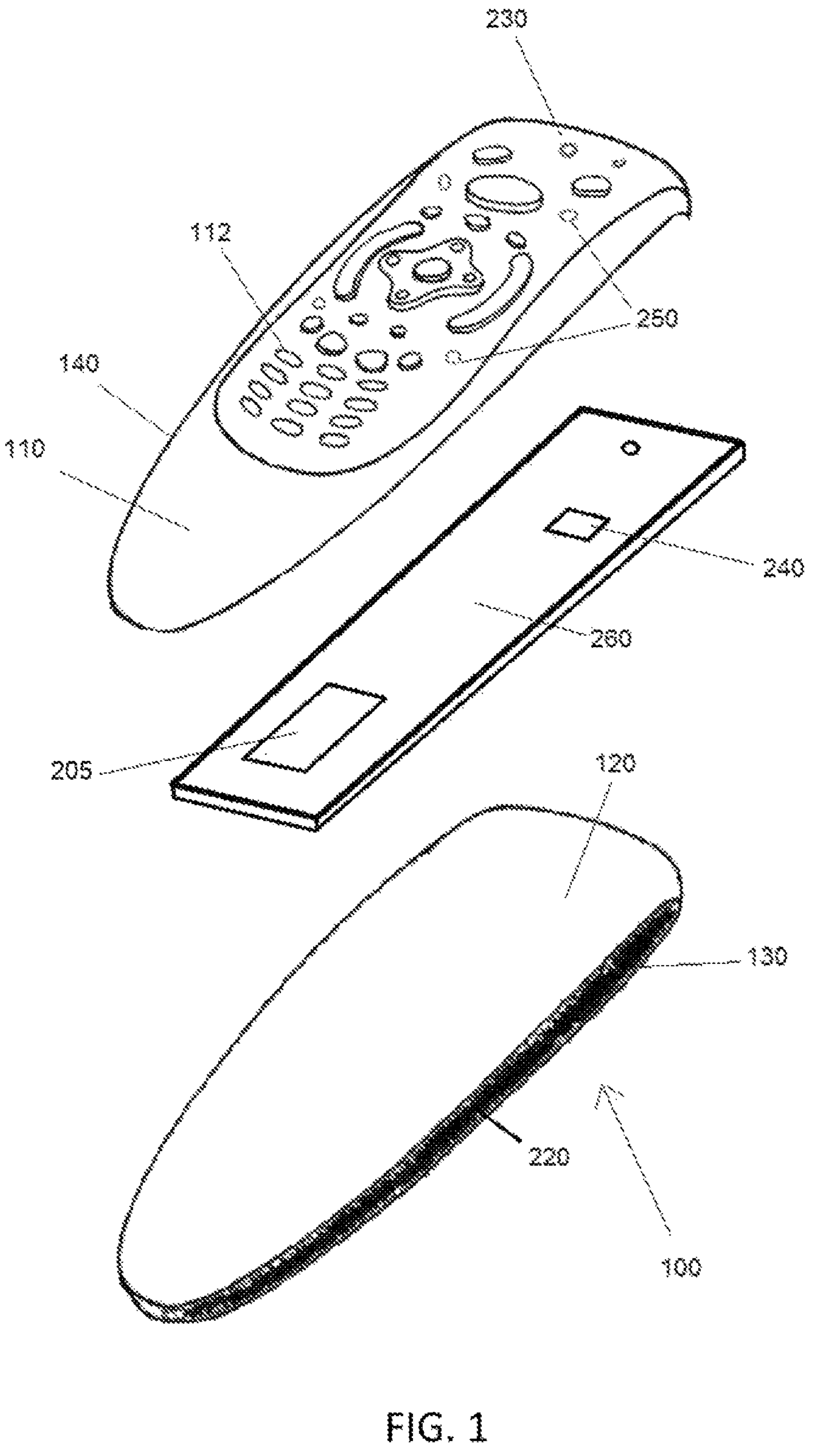
FIG. 1 shows a cutaway view of the remote controller of the present invention.

In a primary embodiment, the present invention is a remote controller with contact switch and remote control button illumination control. The remote controller has a front surface (110) having a plurality of remote control buttons (112) disposed thereon, and a back surface (120) having dials (261, 262) used to adjust the sensitivity of the controller. The front and back surfaces fit together to form an internal cavity. The remote controller has s first side (130) and a second side (140), a pair of contact strips (220) are disposed on the two sides which detect human capacitance when a user picks up the remote. A control board (260) is disposed within the cavity formed by the front surface (110) and the back surface (120), operatively connected to the control buttons.

In a primary embodiment, the control board has electrical circuitry upon it used for the control features of the remote as well as the self-illuminating feature. The self-illuminating circuitry comprises a positive battery contact (301), a negative battery contact (302), a timer circuit (310), and a light sensor circuit (320). The timer circuit and light sensor circuit are each connected to and capable of opening and closing a switch. The timer circuit is configured to output a signal which opens a switch for a set period when activated, and is operatively connected to a contact strip (220), the positive battery contact, and the negative battery contact, which powers the circuit. A first switch (313), controlled by the timer circuit is operatively connected between the light sensor circuit (320) and the positive battery contact. The light sensor circuit (320), is operatively connected to a light sensor (230), and the negative battery terminal. A second switch (323) is controlled by the light sensor circuit, which is operatively connected to at least one lamp (250), and the positive battery terminal. The light sensor (230), disposed on the front surface (110), is capable of detecting ambient light conditions, operatively connected to light sensor circuit of the control board (260).

In a primary embodiment, a battery compartment (205) is disposed within the internal cavity formed by the front surface (110) and the back surface (120), wherein the battery compartment places the batteries into contact with the positive and negative terminals of the control board (260). At least one lamp (250) disposed on the front side (110) operatively connected to the second switch and the negative battery terminal of the control board (260), such that when the switch is closed power flows from the positive battery terminal to the lamp (250). A battery (210) disposed within the battery compartment, wherein the battery is operatively connected to the control board positive and negative battery terminals.

In a primary embodiment, when the user picks up the remote control the contact strips (220) detect the capacitance of the human body, whereupon a signal is generated which activates the timer circuit (310), whereupon the timer circuit outputs a signal which closes the first switch (313), which supplies power to the light sensor circuit (320), whereupon if the light sensor (230) detects low ambient light conditions, the light sensor circuit (320) sends a signal which closes the second switch (323), which supplies power to the lamps (250), wherein, after a period of time, the timer circuit (310) stops sending the signal, which opens the first switch (313) to the light sensor circuit, whereupon the light sensor circuit (320) is no longer powered, whereupon the second switch (323) to the lamps is opened, whereupon the lamps are powered off, wherein if ambient light levels rise above a predetermined level while the light sensor circuit (320) is active, the light sensor circuit opens the switch (323) to the lamps (250), thus cutting off power.

Referring now to FIGS. 1-4, the present invention features a remote controller (100) with touch switch and light sensor for key illumination control. When a user picks up the controller, a touch switch circuit is activated through means of contact strips built into the sides of the device. These strips sense a human body's capacitance. When this is sensed, an ambient light sensor is activated. If the sensor detects low/no light conditions, which are adjustable to a user's preference, it activates a relay which then powers lamps to illuminate the remote controller. The lamps stay illuminated for an adjustable period of time based on user preference.

In a typical embodiment, the remote controller (100) comprises a front surface (110) having plurality of remote control buttons (112); a back surface (120); a first side (130) and a second side (140), wherein a contact strip (220) is disposed on the first side (130) and second side (140), wherein the strip (220) senses a human body capacitance; at least an ambient light sensor (230) disposed on the front surface (110); a timer (240) disposed on a control board (260) within the remote controller (100); at least one lamp (250) disposed on the front side (110); a battery (210) disposed within the remote controller, wherein the battery is operatively connected to the control board (260), contact strip (220), ambient light sensor (230), timer (240) and the lamp (250).

Figure 2:
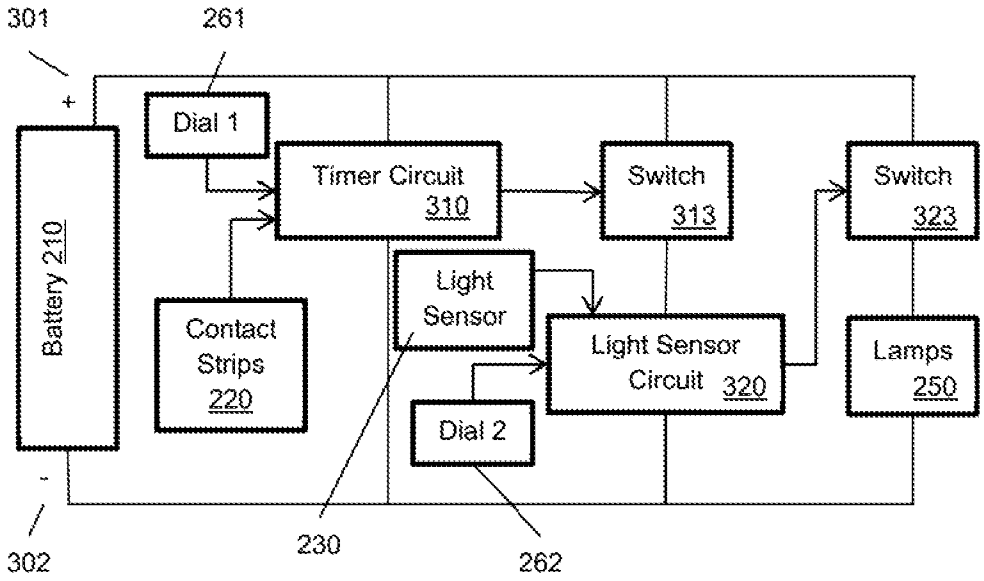
FIG. 2 shows a general schematic of the circuitry of the present invention.
Figure 4:
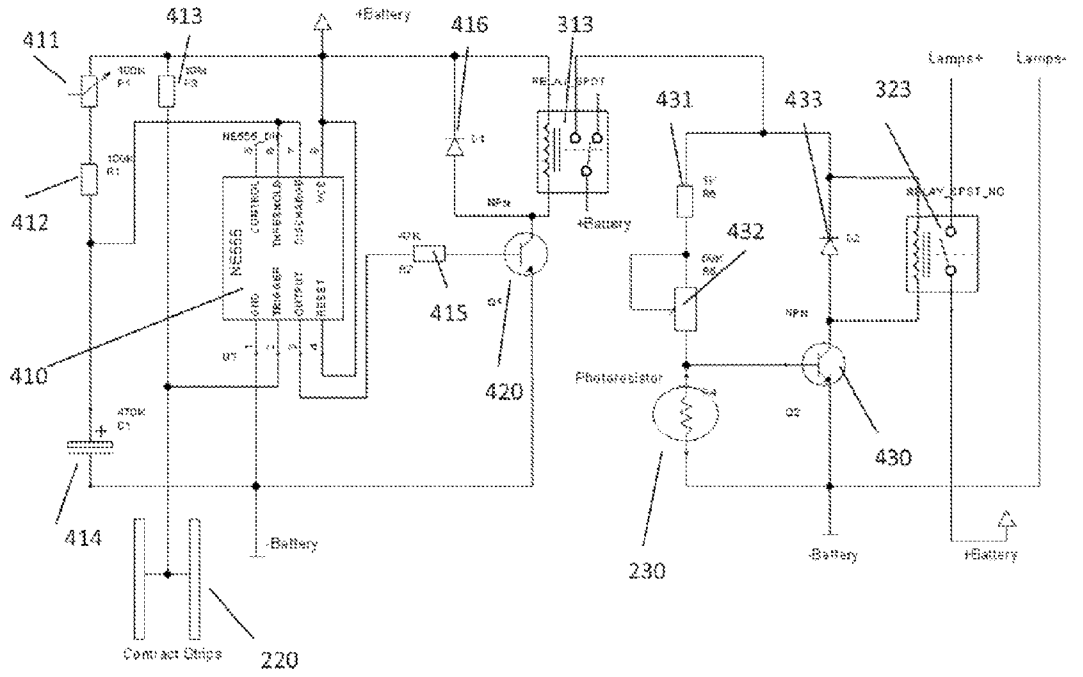
FIG. 4 shows an exemplary detailed circuit schematic of the present invention.

In a typical embodiment, the control board contains a timer circuit (310), and a light sensor circuit (320), each configured to activate a switch. The switches may be magnetic relays or MOSFETs or other types of electrically controlled switches. There are many means of devising electrical circuitry capable of opening a relay switch in response to a stimulus, and many possible variations on the circuitry, as will be well known to those skilled in the art. Exemplary circuitry is shown in FIG. 4. A general schematic is shown in FIG. 2, including a generic timer circuit and light sensor circuit. The timer circuit is connected to the contact strip, while the light sensor circuit is connected to the light sensor.

As human body is an electrical conductor, touching the contact strip results in a distortion of the strip's electrostatic field, measurable as a change in capacitance. The changes in capacitance sensed by the contact strip are sent from the strip to the timer circuit.

In some embodiments, the timer circuit opens a switch that supplies power to the light sensor circuit, while the light sensor circuit controls a switch that supplies power to the lamps. In other embodiments, the light sensor and timer are rearranged so that the light sensor circuit opens a switch that supplies power to the timer circuit, and the timer circuit supplies controls a switch that power to the lamps.

In some embodiments, the ambient light sensor is operatively connected to the light sensor circuit (320), wherein after the strip (220) senses a human body capacitance, the timer circuit (310) sends a first signal to activate the light sensor circuit (260). The ambient light sensor (230) is configured to detect ambient light condition and may comprise a photoresistor (light-dependent resistor). Under low ambient light conditions, the light sensor causes the light sensor circuit to open a switch controls power to the lamps, which causes the lamps to come on.

In some embodiments, the timer circuit (310) is operatively connected to the light sensor circuit (320), wherein after the ambient light sensor (230) detects light conditions below a predetermined light threshold, the light sensor circuit (360) sends a second signal to activate the timer circuit (310). When the user picks up the remote, the contact strips (220) detect a capacitance, which activates the timer circuit (310). The timer circuit sends a signal that opens the switch that controls power to the lamps (250). After a period of time, the timer circuit deactivates shutting of power to the lamp. The predetermined light threshold is indexed as a certain luminous flux in visible light frequency spectrum.

In some embodiments, the lamp (250) is operatively connected to the tinier circuit (310), via a relay switch, wherein after the time circuit opens the switch, the lamp is powered on by the battery (250) and stays illuminated for a predetermined period configured by the timer circuit (310), wherein the lamp is powered of after the Predetermined period.

In some embodiments, the lamp (250) is a light-emitting diode (LED). In some embodiments, the LED is red, blue, green or white, or any other colors that users would prefer.

Figure 3:
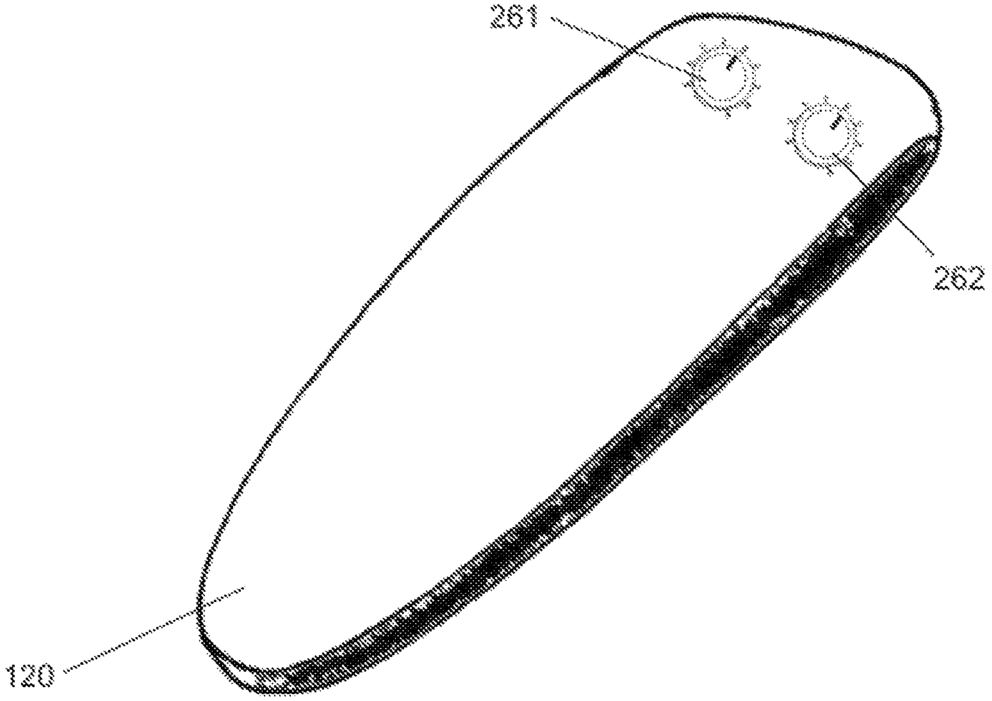
FIG. 3 shows a back surface of the remote controller with a first dial and a second dial.

In some embodiments, the predetermined period is adjustable based on user preference. As shown in FIG. 3, a first dial (261) disposed on the back side (120) of the remote controller is operatively connected to the timer (240) and is functioned to adjust the predetermined period of the timer (240). Dials are well known to one with ordinary art in the field. For example, the predetermined period is 5 seconds. For example, the predetermined period is 10 seconds. For example, the predetermined period is 20 seconds.

In some embodiments, the predetermined light threshold is adjustable based on user preference. For example, some users have difficulty in seeing item at night, then the predetermined light threshold would be a relatively high level such that the LED will be light up even at slight dark situation. In some embodiments, a second dial (262) disposed on the back side (120) of the remote controller is operatively connected to the ambient light sensor (230) and is functioned to adjust the predetermined light threshold of the ambient light sensor (230), as shown in FIG. 3. Dials are well known to one with ordinary art in the field.

In some embodiments, the ambient light sensor (230) is a photo resistor, photodiode or phototransistor. The photo resistor, photodiode or phototransistor would be ordinary art for people in the field.

An exemplary circuit diagram of the present invention is shown in FIG. 4. In this circuit, the timer circuit utilizes the well-known 555 timer chip in a standard monostable circuit configuration, as is well known to those skilled in the art. A potentiometer connected to the first dial (261) adjusts the sensitivity of the circuit to the capacitance detected by the contact strips. The timer chip output controls a BJT transistor, which controls a relay switch from the positive battery terminal to the light sensor circuit. The light sensor circuit comprises a resistor, variable resistor, and photo resistor in series. The variable resistor is connected to the second dial (262). The photo resistor and variable resistor together set the voltage at a transistor base terminal. This allows the second dial to set the sensitivity to the circuit to light at the photoresistor. When ambient light conditions are high, the resistance of the photoresistor drops to zero, which prevents current from flowing through the transistor. When ambient light conditions are low, the transistor opens a path through the relay switch, causing the switch to close and thus supplying power to the lamps.

As previously stated, various modifications to the timer and light sensor circuitry, which achieve the same effect, are possible, which will be obvious to those skilled in the art.

As used herein, the term "about" refers to plus or minus 10% of the referenced number.

The disclosures of the following U.S. patents are incorporated in their entirety by reference herein: U.S. Pat. Nos. 6,848,751, 5,286,092, 8,020,954, 4,441,762, 5,152,584, 7,314,254, U.S. patent application publication 2007/0052280

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A remote controller with touch switch and remote control button illumination control, the remote controller comprising:

a. a front surface (110) having a plurality of remote control buttons (112) disposed thereon;

b. a back surface (120), wherein the front and back surface fit together to form an internal cavity;

c. a first side (130) and a second side (140);

d. a control board (260), disposed within the cavity formed by the front surface (110) and the back surface (120), operatively connected to the control buttons, the control board having electrical circuitry disposed upon it comprising at least:

i. a positive battery contact (301);

ii. a negative battery contact (302);

iii. a timer circuit (310), capable of opening and closing a first switch (313), configured to output a signal for a set period when activated, operatively connected to a plurality of contact strips (220), the positive battery contact (301), and the negative battery contact (302), iv. the first switch (313), controlled by the timer circuit (310), operatively connected between a light sensor circuit (320) and the positive battery contact (301);

v. the light sensor circuit (320), capable of opening and closing a second switch (323), operatively connected to a light sensor (230), and the negative battery contact (302); and vi. the second switch (323), controlled by the light sensor circuit (320), operatively connected to at least one lamp (250), and the positive battery contact (301);

e. a battery compartment (205), disposed within the internal cavity formed by the front surface (110) and the back surface (120), wherein the battery compartment (205) places a battery (210) into contact with the positive and negative contacts (301, 302) of the control board (260);

f. the battery (210) disposed within the battery compartment (205), wherein the battery (210) is operatively connected to the positive and negative battery contacts (301, 302) of the control board (260);

g. the plurality of contact strips (220) disposed on the first side (130) and second side (140), capable of sensing a human body holding the remote, operatively connected to the timer circuit (310) of the control board (260);

h. the light sensor (230), disposed on the front surface (110), capable of detecting ambient light conditions, operatively connected to the light sensor circuit (320) of the control board (260);

i. the at least one lamp (250) disposed on the front side (110) operatively connected to the second switch (323) and the negative battery contact (302) of the control board (260);

j. a first dial (261), disposed upon the back surface (120) of the controller, operatively connected to the timer circuit (310) of the control board (260), wherein the first dial adjusts a length of time that the timer circuit is activated following detection of a capacitance from the plurality of contact strips (220); and k. a second dial (262), disposed upon the back surface (120) of the controller, and operatively connected to the light sensor circuit (320) of the control board (260), wherein the second dial (262) adjusts a sensitivity of the light sensor circuit (320) so that the lamp (250) is activated at varying light levels;

wherein the first and second switches (313, 323) are electrically operated relay switches, wherein the relay switches are normally open, wherein the timer circuit comprises:

a. a timer integrated circuit (IC) (410), having a threshold pin, a discharge pin, a trigger pin, an output pin, a reset pin, a power pin and a ground pin, wherein the power pin is operatively connected to the positive battery contact (301) and the ground pin is operatively connected to the negative battery contact (302), wherein the plurality of contact strips (220) are connected to the trigger pin, wherein the reset pin is connected to the positive battery contact (301), b. a potentiometer (411), operatively connected to the first dial (261), electrically connected to the positive battery contact (301), c. a first resistor (412), connected in series with the potentiometer (411), d. a capacitor (414), connected in series with the first resistor (412), electrically connected to the negative battery contact (302), where the capacitor (414) and the first resistor (412) are connected to the threshold and discharge pins of the timer IC (410) at their junction, e. a second resistor (413), operatively connected between the positive battery contact, and the plurality of contact strips (220) and the trigger pin of the timer IC (410), f. a third resistor (415), connected between the timer IC (410) output pin, and a base pin of a transistor (420), g. the transistor (420), connected to a diode (416) and to a control pin of the first relay switch (313), at a collector pin, to the third resistor (415) at a base pin, and to the negative battery contact (302), at an emitter pin, and h. the diode (416), connected between the transistor (420) and the positive battery contact (301), oriented so as to permit current to flow from the transistor to the positive battery contact (301), wherein the first relay switch is connected in parallel with the diode, wherein, when a user picks up the remote controller, the contact strips (220) detect the capacitance of the human body, whereupon a first signal is generated which activates the timer circuit (310), whereupon the timer circuit (310) outputs a second signal which closes the first switch (313), which supplies power to the light sensor circuit (320), whereupon if the light sensor (230) detects low ambient light conditions, the light sensor circuit (320) sends a third signal which closes the second switch (323), which supplies power to the at least one lamp (250), wherein, after a period of time, the timer circuit (310) stops sending the second signal, which opens the first switch (313) to the light sensor circuit (320), whereupon the light sensor circuit (320) is no longer powered, whereupon the second switch (323) to the at least one lamp (250) is opened, whereupon the at least one lamp (250) is powered off, wherein if ambient light levels rise above a predetermined level while the light sensor circuit (320) is active, the light sensor circuit (320) opens the second switch (323) to the at least one lamp (250), thus cutting off power, wherein the potentiometer (411) is controlled by the first dial (261), which adjusts a voltage at the threshold and discharge pins of the timer IC (410), which adjusts the length of time that the timer IC (410) outputs the second signal, wherein when the contact strips (220) are touched by a human, the change in capacitance causes a voltage change at the trigger pin of the timer IC (410), which causes the timer IC (410) to output the second signal on the output pin, whereupon current flows to the transistor base pin, whereupon the transistor (420) allows current to flow from the positive battery contact (301) through the first relay switch (313) to the negative battery contact (302), whereupon the first relay switch (313) moves to a closed position, whereupon the light sensor circuit (320) is powered.

2. A remote controller with touch switch and remote control button illumination control, the remote controller comprising:

a. a front surface (110) having a plurality of remote control buttons (112) disposed thereon;

b. a back surface (120), wherein the front and back surface fit together to form an internal cavity;

c. a first side (130) and a second side (140);

d. a control board (260), disposed within the cavity formed by the front surface (110) and the back surface (120), operatively connected to the control buttons, the control board having electrical circuitry disposed upon it comprising at least:

i. a positive battery contact (301);

ii. a negative battery contact (302);

iii. a timer circuit (310), capable of opening and closing a first switch (313), configured to output a signal for a set period when activated, operatively connected to a plurality of contact strips (220), the positive battery contact (301), and the negative battery contact (302), iv. the first switch (313), controlled by the timer circuit (310), operatively connected between a light sensor circuit (320) and the positive battery contact (301);

v. the light sensor circuit (320), capable of opening and closing a second switch (323), operatively connected to a light sensor (230), and the negative battery contact (302); and vi. the second switch (323), controlled by the light sensor circuit (320), operatively connected to at least one lamp (250), and the positive battery contact (301);

e. a battery compartment (205), disposed within the internal cavity formed by the front surface (110) and the back surface (120), wherein the battery compartment (205) places a battery (210) into contact with the positive and negative contacts (301, 302) of the control board (260);

f. the battery (210) disposed within the battery compartment (205), wherein the battery (210) is operatively connected to the positive and negative battery contacts (301, 302) of the control board (260);

g. the plurality of contact strips (220) disposed on the first side (130) and second side (140), capable of sensing a human body holding the remote, operatively connected to the timer circuit (310) of the control board (260);

h. the light sensor (230), disposed on the front surface (110), capable of detecting ambient light conditions, operatively connected to the light sensor circuit (320) of the control board (260);

i. the at least one lamp (250) disposed on the front side (110) operatively connected to the second switch (323) and the negative battery contact (302) of the control board (260);

j. a first dial (261), disposed upon the back surface (120) of the controller, operatively connected to the timer circuit (310) of the control board (260), wherein the first dial adjusts a length of time that the timer circuit is activated following detection of a capacitance from the plurality of contact strips (220); and k. a second dial (262), disposed upon the back surface (120) of the controller, and operatively connected to the light sensor circuit (320) of the control board (260), wherein the second dial (262) adjusts a sensitivity of the light sensor circuit (320) so that the lamp (250) is activated at varying light levels;

wherein the first and second switches (313, 323) are electrically operated relay switches, wherein the relay switches are normally open, wherein the light sensor circuit comprises:

a. a first resistor (431), connected in series to a first relay switch output pin, b. a variable resistor (432), operatively connected to the second dial (262), connected in series with the first resistor (431), wherein the light sensor (230) is connected in series with the variable resistor (432) to the negative battery contact (302), c. a transistor (430), wherein a base pin of the transistor (430) is connected to a positive end of the light sensor (230), wherein a collector pin of the transistor (430) is connected to a negative control pin of the second relay switch (323), wherein an emitter pin of the transistor (430) is connected to the negative battery contact (302), and d. a diode (433), connected in parallel with the second relay switch (323), connected to the first relay switch output pin, and to the collector pin of the transistor, oriented to permit current to flow from the transistor back to the positive battery contact (301), wherein, when a user picks up the remote controller, the contact strips (220) detect the capacitance of the human body, whereupon a first signal is generated which activates the timer circuit (310), whereupon the timer circuit (310) outputs a second signal which closes the first switch (313), which supplies power to the light sensor circuit (320), whereupon if the light sensor (230) detects low ambient light conditions, the light sensor circuit (320) sends a third signal which closes the second switch (323), which supplies power to the at least one lamp (250), wherein, after a period of time, the timer circuit (310) stops sending the second signal, which opens the first switch (313) to the light sensor circuit (320), whereupon the light sensor circuit (320) is no longer powered, whereupon the second switch (323) to the at least one lamp (250) is opened, whereupon the at least one lamp (250) is powered off, wherein if ambient light levels rise above a predetermined level while the light sensor circuit (320) is active, the light sensor circuit (320) opens the second switch (323) to the at least one lamp (250), thus cutting off power, wherein a resistance of the variable resistor (432) depends on a position of the second dial (262), wherein a light sensor resistance varies inversely to the light conditions, wherein a voltage at the base pin of the transistor (430) varies as a result of both inputs, whereupon if the voltage is high enough, current flows into the base pin of the transistor, whereupon current flows through the collector pin to the emitter pin of the transistor, whereupon current flows through the negative control pin and a positive control pin of the second relay switch, wherein the second relay switch moves to a closed position, wherein as a result, the at least one lamp (250) is powered only if the ambient light conditions are low enough and a setting of the variable resistor is set low enough to create a sufficient voltage at the base pin of the transistor, wherein as a result, the second dial (262) allows the light sensor circuit sensitivity to ambient light to be adjusted.

* * * * *